United States Patent
Omata

(10) Patent No.: US 10,175,451 B2
(45) Date of Patent: Jan. 8, 2019

(54) IMAGING APPARATUS AND FOCUS ADJUSTMENT METHOD

(71) Applicant: Olympus Corporation, Hachioji-shi, Tokyo (JP)

(72) Inventor: Yoshinobu Omata, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 15/682,410

(22) Filed: Aug. 21, 2017

(65) Prior Publication Data

US 2018/0059360 A1 Mar. 1, 2018

(30) Foreign Application Priority Data

Aug. 24, 2016 (JP) .................................. 2016-163674

(51) Int. Cl.
*H04N 5/232* (2006.01)
*G02B 7/28* (2006.01)
*G03B 13/36* (2006.01)
*G03B 19/12* (2006.01)
*G02B 7/34* (2006.01)

(52) U.S. Cl.
CPC ............. *G02B 7/285* (2013.01); *G03B 13/36* (2013.01); *H04N 5/23212* (2013.01); *G02B 7/34* (2013.01); *G03B 19/12* (2013.01)

(58) Field of Classification Search
CPC .................................................. H04N 5/23212
USPC ........................................................ 348/345
See application file for complete search history.

(56) References Cited

U.S. PATENT DOCUMENTS

| | | | |
|---|---|---|---|
| 4,980,715 A | 12/1990 | Utagawa | |
| 2009/0148147 A1* | 6/2009 | Fujii | G03B 13/32 396/128 |
| 2014/0332661 A1* | 11/2014 | Fukuda | H04N 5/23212 250/201.7 |

FOREIGN PATENT DOCUMENTS

| | | |
|---|---|---|
| JP | 2012-168383 | 9/2012 |
| JP | 2015-049251 | 3/2015 |

* cited by examiner

*Primary Examiner* — Joel W Fosselman
(74) *Attorney, Agent, or Firm* — John C. Pokotylo; Pokotylo Patent Services

(57) ABSTRACT

An imaging device comprises an image sensor on which phase difference detection pixels are formed, a rapid shooting controller that carries out rapid shooting of still pictures by causing operation of the image sensor, and generates and stores image data based on image signals output by the image sensor, and a controller for focusing control that carries out the rapid shooting and causes operation of the image sensor between one exposure of the rapid shooting and the next to carry out first focus detection based on focus detection signals generated by the phase difference detection pixels, carries out second focus detection based on focus detection signals generated by the phase difference detection pixels as a result of the rapid shooting, and carries out focus adjustment based on results of the first focus detection and results of the second focus detection.

12 Claims, 9 Drawing Sheets

FIG. 2

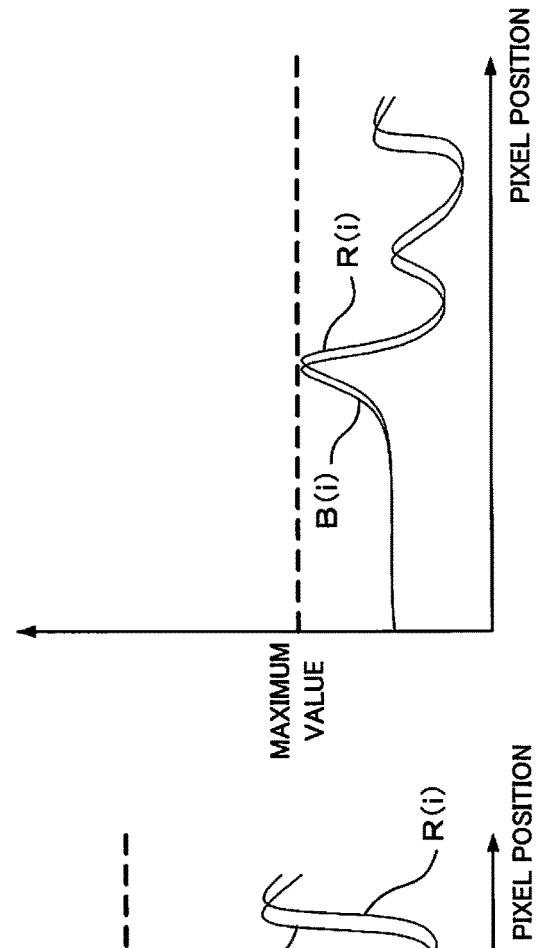
FIG. 7A
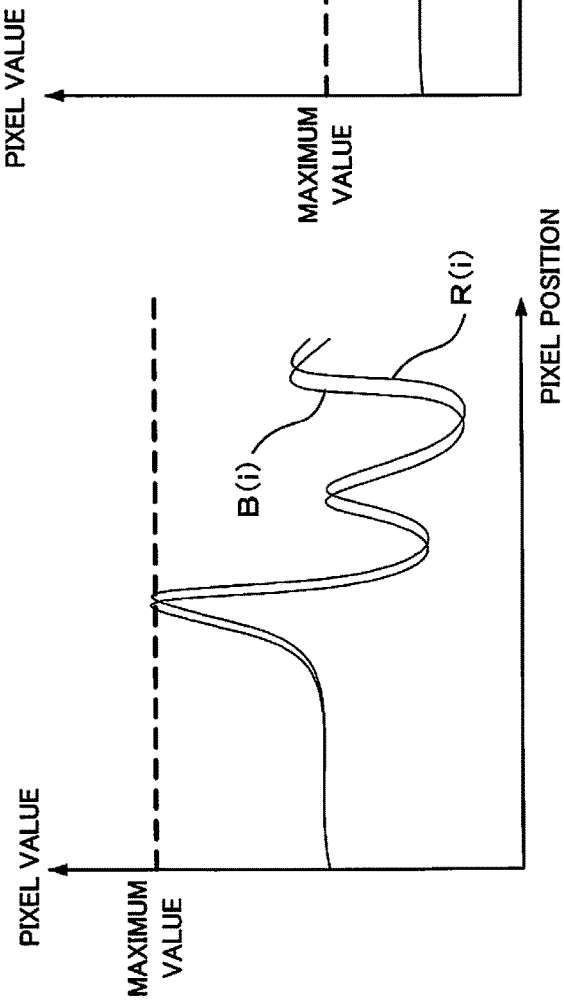
FIG. 7B
FIG. 8
| EXPOSURE OFFSET AMOUNT (AEPEX) | CORRECTION MAGNIFICATION (MAGNIFICATION) |
|---|---|
| cvaf ≦ -2 | 4 |
| -2 < cvaf ≦ -1 | 2 |
| -1 < cvaf < 1 | 1 |
| 1 ≦ cvaf ≦ 2 | 1/2 |
| 2 ≦ cvaf | 1/4 |

PRIO ART

PRIO ART

IMAGING APPARATUS AND FOCUS ADJUSTMENT METHOD

CROSS-REFERENCE TO RELATED APPLICATIONS

Benefit is claimed, under 35 U.S.C. § 119, to the filing date of prior Japanese Patent Application No. 2016-163674 filed on Aug. 24, 2016. This application is expressly incorporated herein by reference. The scope of the present invention is not limited to any requirements of the specific embodiments described in the application.

BACKGROUND OF THE INVENTION

1. Field of the Invention

The present invention relates to an imaging apparatus and focus adjustment method that carry out focus adjustment based on a focus detection signal output by an image sensor.

2. Description of the Related Art

There have been some surprising advancements with the high functionality of digital cameras, and performance is also advancing day by day. Using various functions it has become possible to take high quality photographs without depending on the expertise of the photographer. Autofocus is also one of these functions, and in order to precisely shoot a subject that is moving it is necessary to accurately perform ranging for position of the subject, predict subject position based on the ranging information, and drive the lens.

In recent years, imaging devices have been proposed having phase difference detection pixels arranged on an imaging surface of an image sensor, with defocus amount of a focus lens being detected based on signals from the phase difference detection pixels and subject position being estimated based on chronological change in this defocus amount.

For example, in Japanese patent laid open number Hei. 07-199058 (hereafter referred to as "patent publication 1"), there is disclosed, in a focus detection device that can estimate movement of a target object during rapid shooting mode, in the case of continuous shooting mode where, while a release button is being pressed down, film exposure is carried out a first time and then film exposure is carried out a second time continuously after the first film exposure has been performed, carrying out moving body estimation computation for an object based on a past defocus amount that was detected before the first exposure and a current defocus amount that has been detected between the first film exposure and the second film exposure.

Also, with a system that carries out phase difference AF using output of phase difference detection pixels that have been arranged on an imaging surface of an image sensor for image forming, pixels for focus detection are formed at positions where pixels for image forming were supposed to be formed. Accordingly, in Japanese patent laid-open number 2012-168383 (hereafter referred to as "patent publication 2") it is disclosed to reduce degradation of an image formed on an image sensor for image forming by increasing dispersion of focus detection pixels.

Also, Japanese patent laid open number 2015-049251 (hereafter referred to as "patent publication 3") discloses a method, in the case of shooting a moving body, for being able to set control parameters relating to focus precision, and preventing lens following delay by controlling movement speed of a focus lens.

With an image plane phase difference method, since phase difference detection pixels are formed on an image sensor, at given intervals on the image sensor, image quality degradation of a taken image is significant if phase difference detection pixel are arranged densely on the image sensor. Accordingly, in order to make the effect on a taken image as small as possible, phase difference detection pixels formed on the image sensor should be arranged coarsely and discretely. However, if the phase difference detection pixels are arranged discretely, in a case where there are fine patterns in the subject, and cases where a subject varies minutely on an imaging surface due to subject movement, AF precision will be lowered due to ranging dispersion (differences in light amount between left and right openings etc.). As a result, in the case of shooting a subject that is moving in continuous AF mode, dispersion (error) also arises in moving body estimation computation results due to ranging dispersion, and focusing precision is reduced.

Dispersion in moving prediction ranging computation results due to this ranging dispersion will be explained using FIG. 12A and FIG. 12B. FIG. 12A and FIG. 12B are calculations of lens position (the vertical axis shows pulse number pls for lens drive) at the time of focusing based on defocus amount that has been detected, in a case where a subject moves from an infinity direction toward a close up direction. In FIG. 12A and FIG. 12B, the horizontal axis represents lapse of time, and black dots represent lens position historical data.

FIG. 12A shows an example where ranging dispersion is small, and the historical data (shown by black dots) increases monotonically. On the other hand, FIG. 12B shows an example where ranging dispersion is large, and the historical data does not increase monotonically. Ranging dispersion occurs due to an arrangement method of the phase difference detection pixel on the image sensor, patterns in a subject, subject position etc.

In order to improve trackability of a moving body at the time of shooting a moving body using continuous AF, it is preferable to carry out ranging more often per unit time. In particular, during rapid shooting, intervals at which it is possible to perform ranging become far apart because it takes time for lens drive and to read out taken images. For this reason, it has been considered to carry out ranging using taken images for actual exposure. However, in cases such as either when an actual exposure taken image has exposure conditions that are not optimum for ranging, or a photographic diaphragm is not wide open, baseline length is short and so dispersion due to ranging errors are caused in addition to the previously described ranging dispersion. With these dispersions as a primary factor, moving body prediction precision for continuous AF is not stable and focus precision for taken images is lowered.

SUMMARY OF THE INVENTION

An imaging device of a first aspect of the present invention, that has an image sensor formed with phase difference detection pixels that generate pairs of focus detection signals by subjecting light flux that has passed through an optical system, including a focus lens, to pupil division, receiving light and carrying out photoelectric conversion, carries out focus adjustment based on focus detection signals output by the image sensor, and comprises a rapid shooting controller that carries out rapid shooting of still pictures by causing operation of the image sensor, and generates and stores image data based on image signals output by the image sensor, and a controller for focusing control that carries out the rapid shooting and causes operation of the image sensor during the rapid shooting to carry out first focus detection based on focus detection signals generated by the phase difference detection pixels, carries out second focus detection based on focus detection signals generated by the phase difference detection pixels as a result of the rapid shooting, and carries out focus adjustment based on results of the first focus detection and results of the second focus detection.

A focus adjustment method of a second aspect of the present invention, for an imaging device that has an image sensor formed with phase difference detection pixels that generate pairs of focus detection signals by subjecting light flux that has passed through an optical system, including a focus lens, to pupil division, receiving light and carrying out photoelectric conversion, and that carries out focus adjustment based on focus detection signals output by the image sensor, comprises carrying out rapid shooting of still pictures by causing operation of the image sensor, and generating and storing image data based on image signals output by the image sensor, causing operation of the image sensor between one frame of the rapid shooting and the next to carry out first focus detection based on focus detection signals generated by the phase difference detection pixels, carrying out second focus detection based on focus detection signals generated by the phase difference detection pixels as a result of the rapid shooting, and carrying out focus adjustment based on results of the first focus detection and results of the second focus detection.

BRIEF DESCRIPTION OF THE DRAWINGS

FIG. 2 is a plan diagram showing arrangement of pixels of an image sensor of a camera of one embodiment of the present invention.

FIG. 7A and FIG. 7B are graphs showing phase difference detection signals at the time of actual exposure and at the time of AF ranging, in the camera of one embodiment of the present invention.

FIG. 8 is a table showing relationships of correction magnification factors with respect to exposure offset amount, in the camera of one embodiment of the present invention.

DETAILED DESCRIPTION OF THE PREFERRED EMBODIMENTS

An example where a digital camera (hereafter simply called "camera") is adopted as one embodiment of the present invention will be described in the following. This camera has an image sensor on which are formed imaging pixels for subjecting a subject image that has been formed by a photographing optical system to photo electric conversion, and phase difference detection pixels that generate a focus detection signal by subjecting light flux from the photographing optical system to pupil division and carrying out photo electrical conversion, and performs autofocus using pixel data from the phase difference detection pixels.

This camera also converts a subject image to image data using the image sensor, and the subject image is subjected to live view display on a display section arranged on the rear surface of the camera body based on this converted image data. A user determines composition and photo opportunity by looking at the live view display. At the time of a release operation image data is stored in a storage medium. Image data that has been stored in the storage medium can be played back and displayed on the display section if playback mode is selected.

Figure 9:
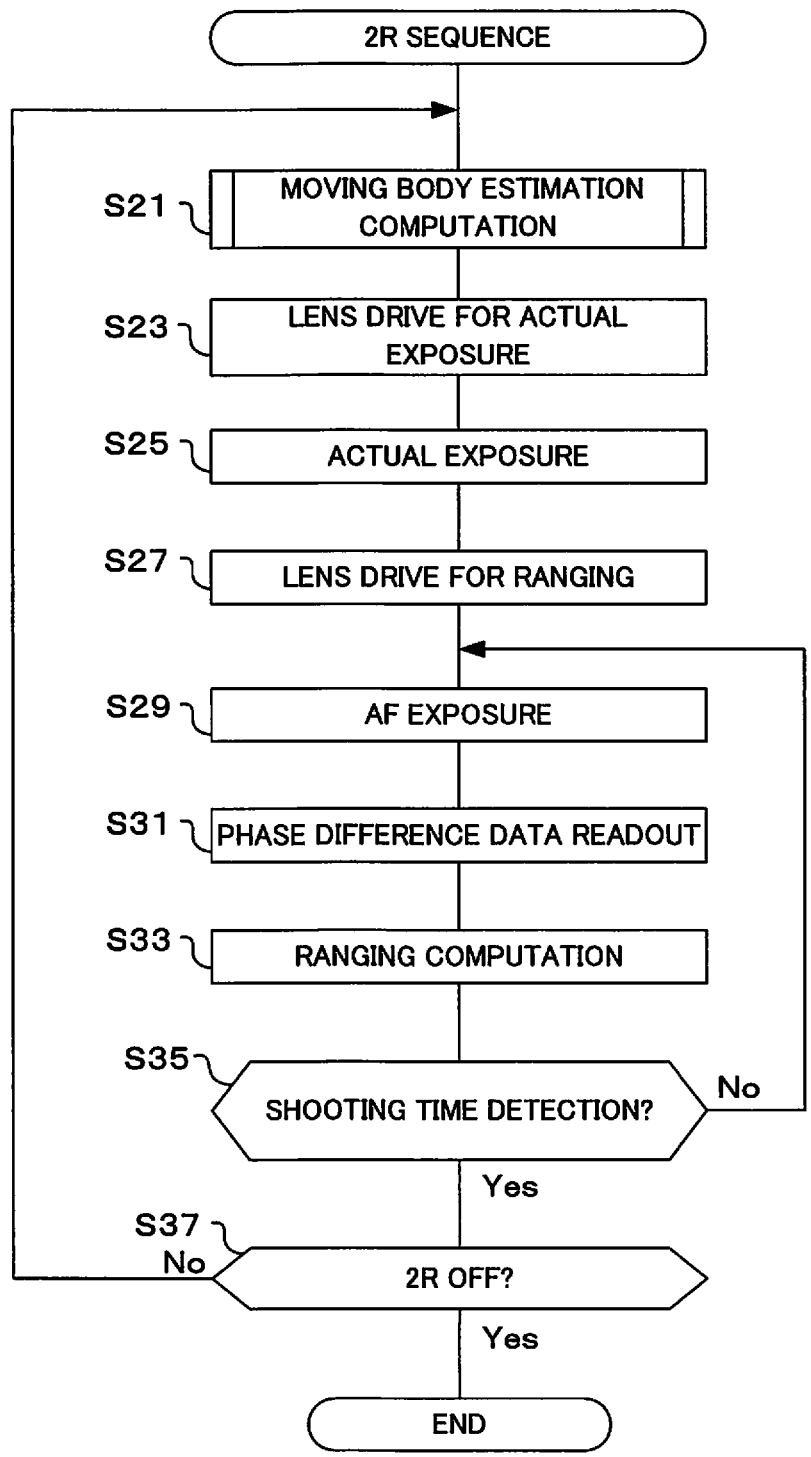
FIG. 9 is a flowchart showing operation of the camera of one embodiment of the present invention at the time of 2R.

This camera also repeats actual exposure in order to store still images if the release button is pressed down fully in a state where continuous AF has been set and continuous shooting is commenced, and carries out actual exposure for ranging (refer, for example, to S29 in FIG. 9) between an actual exposure and the next actual exposure (refer, for example, to S25 in FIG. 9). Ranging information is acquired using image data from phase difference detection pixels, among the image data that has been acquired by the actual exposure and the exposure for distance measurement (refer, for example, to S33 in FIG. 9), and moving body prediction is carried out based on this ranging information (refer, for example, to S21 in FIG. 9 and to FIG. 10).

Figure 1:
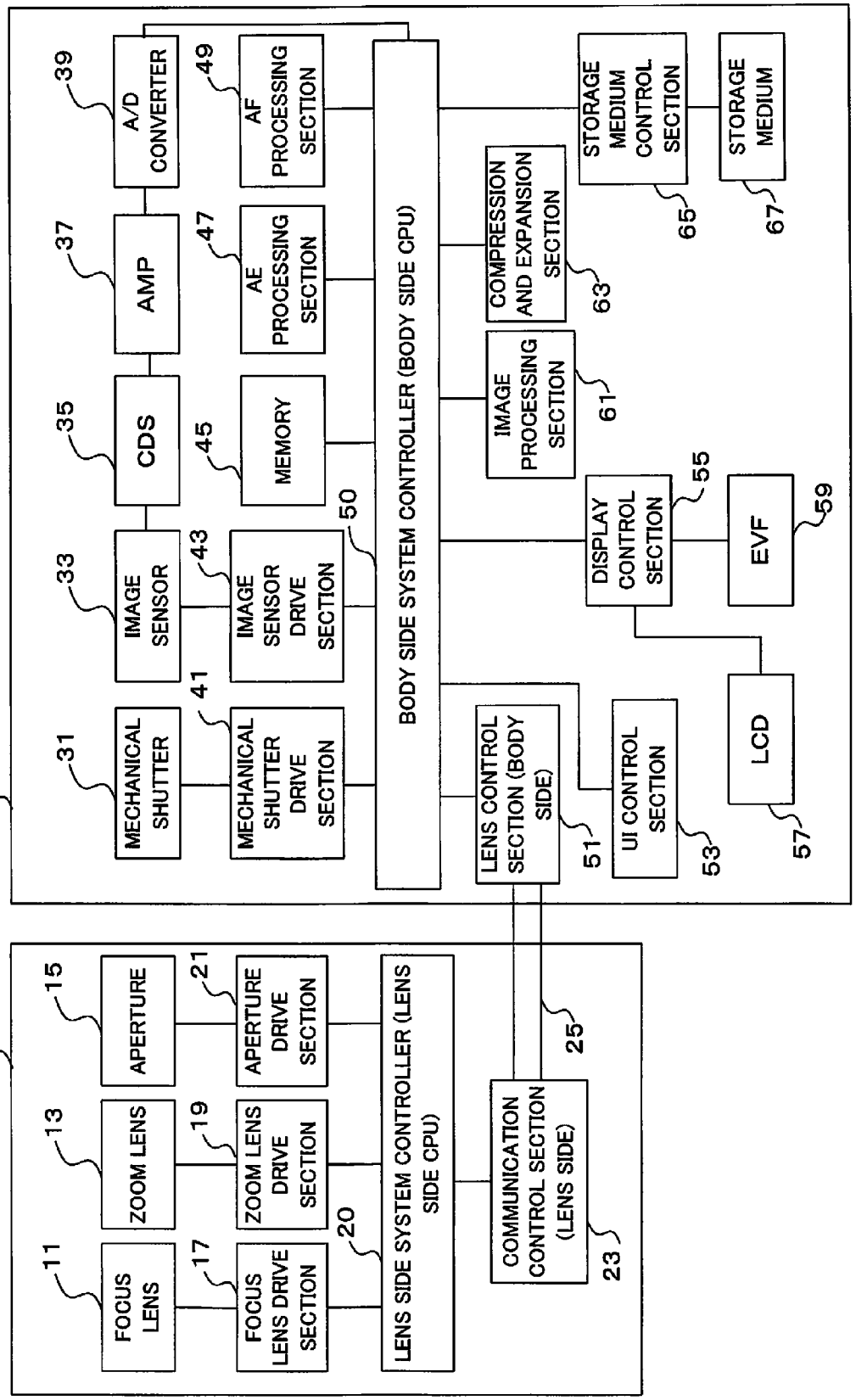
FIG. 1 is a block diagram mainly showing the electrical structure of a camera of one embodiment of the present invention.

FIG. 1 is a block diagram mainly showing the electrical structure of the camera of this embodiment. The camera of this embodiment comprises a camera body 30, and a photographing lens 10 that is capable of being attached to and detached from this camera body 30. It should be noted that the photographing lens 10 and the camera body 30 may also be formed integrally.

An optical lens comprising a focus lens 11 and a zoom lens 13 for forming a subject image is provided within the photographing lens 10. The focus lens 11 is capable of being moved in the optical axis direction by a focus lens drive section 17, and focus position of a subject image is changed by this movement. The zoom lens 13 is capable of being moved in the optical axis direction by a zoom lens drive section 19, and focal length of the photographing lens is changed by this movement. The focus lens drive section 17 has a focus lens drive mechanism and a focus lens drive circuit, while the zoom lens drive section 19 has a zoom lens drive mechanism and a zoom lens drive circuit.

An aperture 15 is arranged on the optical axis of the focus lens 11 and zoom lens 13 etc. This aperture 15 has opening diameter varied by an aperture drive section 21, and controls light amount of subject light flux that has passed through the optical lens. The aperture drive section 21 has an aperture drive mechanism and an aperture drive circuit. The aperture 15 functions as an aperture that adjusts light flux that passes through the photographing optical system that receives light using the image sensor.

The focus lens drive section 17, zoom lens drive section 19 and aperture drive section 21 are connected to a lens side system controller 20. This lens side system controller (hereafter referred to as lens side CPU) 20 has a CPU (Central Processing Unit) and peripheral circuits and a storage section (memory) for this CPU, and controls each section within the photographing lens 10 in accordance with instructions from a system controller 50 of the camera body camera body 30 (hereafter referred to as body side CPU)), in accordance with programs stored in the storage section, and outputs various information to the camera body 30.

A lens side communication control section 23 has a communication control circuit, and is connected to the lens side CPU 21. This lens side communication control section 23 performs output of data and control signals via a lens control section 51 that is provided within the camera body 30 and a communication circuit 25.

Within the camera body 30, a mechanical shutter 31 is provided at a front surface side of an image sensor 33, on the optical axis of the optical system. The mechanical shutter 31 is driven to open and close by a mechanical shutter drive section 41, and controls a time for which subject light flux passes. The mechanical shutter drive section 41 has a mechanical shutter drive mechanism and a mechanical shutter drive circuit. Subject light flux that has passed through the optical system, such as the focus lens 11 and the zoom lens 13, and the aperture 15, is guided through the mechanical shutter 31 in an open state to the image sensor 33. The mechanical shutter drive section 41 reopens the mechanical shutter 31 after it has been temporarily closed in response to a shooting instruction from the body side CPU 50, and closes the mechanical shutter 31 once an exposure time that has been manually or automatically set has elapsed. This exposure time is controlled by the body side CPU 50.

The image sensor 33 has a photoelectric surface on which a great many light receiving elements are arranged in a matrix shape, with a subject image that as passed through the optical lens being formed on the photoelectric surface and subjected to photoelectric conversion. Respective color filters for each of RGB are arranged in a mosaic shape on the surface of each light receiving elements of the image sensor 33. A pixel arrangement of the image sensor 33 will be described later using FIG. 2. The image sensor 33 functions as an image sensor having phase difference detection pixels formed thereon that generate pairs of focus detection signals by receiving light flux that has passed through the photographing optical system, including the focus lens, by means of pupil division, and carrying out photoelectric conversion.

The image sensor 33 is connected to an image sensor drive section 43 that has an image sensor drive circuit, and reads out electrical charge that has been accumulated in each pixel in synchronization with a vertical transfer clock signal and a horizontal transfer clock signal supplied from the image sensor drive section 43, and outputs as an image signal to a CDS 35. Exposure time of accumulation for each pixel is controlled by an electronic shutter drive signal supplied from the image sensor drive section 43.

The CDS 35 is a Correlated Double Sampling Circuit, and carries out noise reduction of an image signal that has been output from the image sensor 33, carries out gain adjustment and outputs to an AMP 37. The AMP 37 is an amplifier circuit, that amplifies an image signal from the CDS 35 and outputs to an A/D converter 39. The A/D converter 39 converts an analog image signal to a digital image signal, and outputs to the body side CPU 50.

A memory 45 has an electrically rewritable non-volatile memory and an electrically rewritable volatile memory, and stores programs (software) for causing operation of this camera and various adjustment data, and temporarily stores various flags and image data etc. The memory 45 also functions as a buffer for temporary management of RAW image data that has been continuously taken and image data that has been further subjected to image processing. Image data that has been stored in the memory 45 that is acting as a buffer is successively stored to a storage medium.

An AE (Auto Exposure) processing section 47 has an AE processing circuit, and calculates brightness of a subject image based on image data from imaging pixels for image formation of the image sensor 33, and outputs to the body side CPU 50. The body side CPU 50 calculates exposure control parameters such as aperture value, ISO sensitivity and shutter speed etc. based on the subject brightness that has been input. The AE processing section 47 functions as an exposure control circuit that controls exposure operation by calculating exposure control values in order to control exposure amount of the image sensor at the time of rapid shooting of still pictures or at the time of acquiring focus detection signals between one rapid shooting exposure and the next rapid shooting exposure.

An AF processing section 49 has an AF circuit, and calculates defocus amount based on image data from the phase difference detection pixel of the image sensor 33 and outputs to the body side CPU 50. The AF (Auto Focus) circuit is used when repeatedly processing a large amount of image data, such as for phase difference detection and reliability detection, which will be described later.

A UI (User interface) control section 53 has user interfaces such as operation members like switches, buttons, a dial etc. and a touch screen, and detects states of these operation members and touch states of the touch screen and outputs to the body side CPU 50. If the user carries out camera operations using an interface such as switches, the body CPU 50 carries out control of the camera overall based on output from the UI control section 53.

A release button is provided as an operation member, and is configured such that a 1R switch is turned on by pressing the release button down half way, while a 2R switch (and the 1R switch) is turned on by pressing the release button down fully. There may be cases where a state of the 1R switch being on or off, due to there being a half press operation or there not being a half press operation, may be written as 1R ON or 1R OFF. Also, there may be cases where a state of the 2R switch being on or off, due to there being a full press operation or there not being a half press operation, may be written as 2R ON or 2R OFF.

An LCD (Liquid Crystal Display) 57 is a thin planar display device that utilizes a liquid crystal composition, and is arranged on the rear surface or the like of the camera body 30. Also, with an EVF (Electronic View Finder) it is possible to observe a display device such as a small-sized liquid crystal display by means of an eyepiece. The LCD 57 and EVF 59 carry out display of a live view image, playback image, and the image information based on image data from the display control section 55. It should be noted that besides liquid crystal, the LCD 57 may also be a display panel such as organic EL etc.

An image processing section 61 has an image processing circuit, and applies image processing to image data from the image sensor 33 to generate image data for live view display on the LCD 57 and the EVF 59. Also, at the time of shooting, image data for storage is generated, and at the time of movie shooting movie data is generated.

A compression and expansion section 63 has a compression and expansion circuit, and carries out compression processing such as JPEG on image data that has been subjected to image processing by the image processing section 61, stores the compressed image data using the storage medium 67, and carries out expansion processing on image data that has been read out.

The storage medium 67 is an electrically rewritable nonvolatile external memory, and performs storage and readout using a storage medium control section 65 that has a storage medium control circuit. Image data for storage that has been generated by the image processing section 61 and the compression and expansion section 63 is stored in the storage medium 67. At the time of a rapid shooting operation, still picture image data that has been acquired is sequentially stored in the storage medium 67, but there may be cases where the storage rate is slow compared to the rapid shooting rate. In this type of case, still picture image data is temporarily stored in memory 45 that functions as a buffer, and afterward is sequentially read out from the memory 45 and stored in the storage medium 67.

The body side CPU 50 has a CPU (Central Processing Unit) and peripheral circuits for the CPU, and carries out control of the camera system overall by controlling each section within the camera body 30 and the photographing lens 10 in accordance with programs (firmware) that have been stored in the memory 45.

Figure 4:
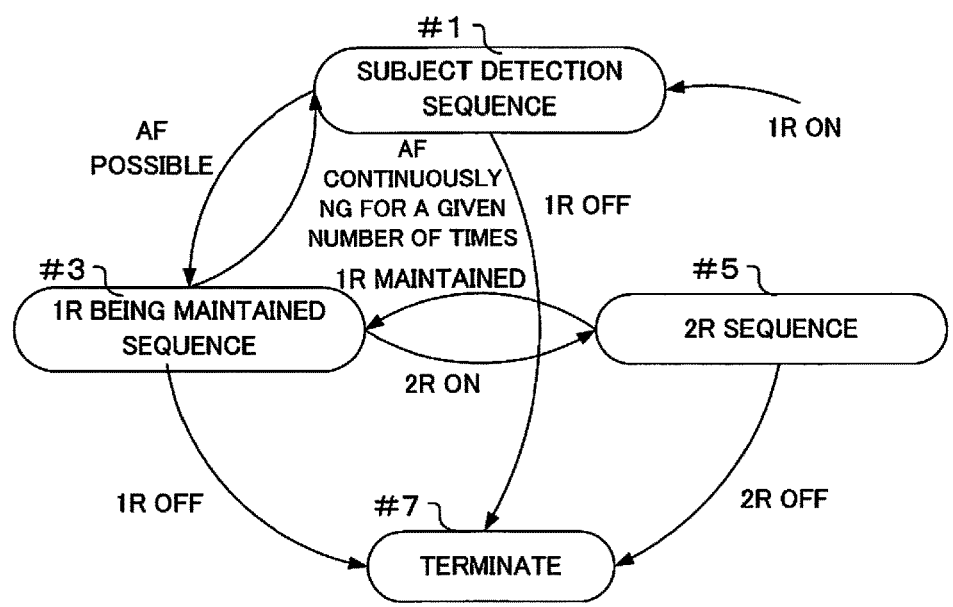
FIG. 4 is a state transition drawing showing relationships between various states, in the camera of one embodiment of the present invention
Figure 6:
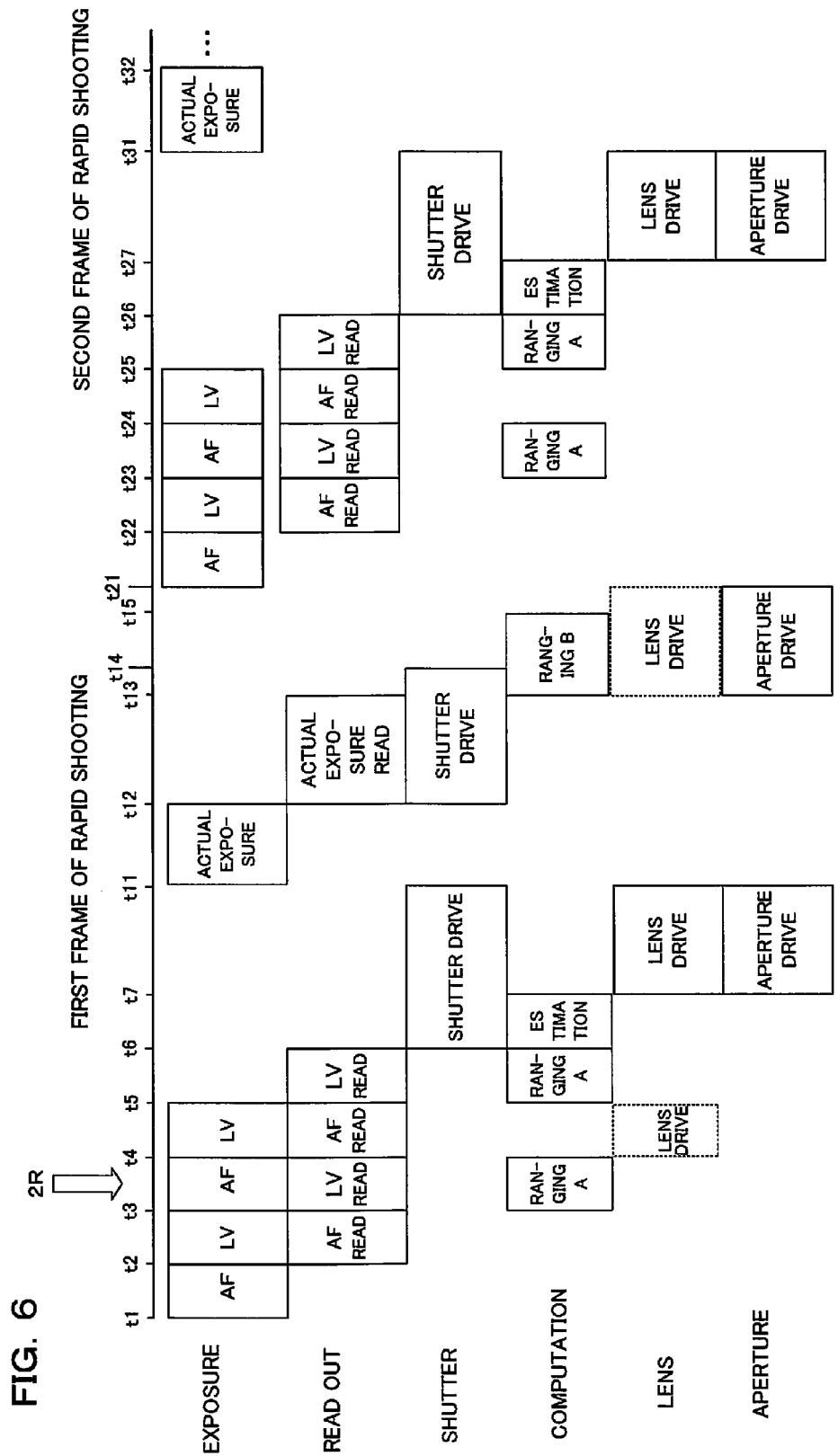
FIG. 6 is a drawing showing an operating sequence at the time of continuous AF setting, in the camera of one embodiment of the present invention.

The body side CPU 50 functions as a rapid shooting controller that carries out rapid shooting of still pictures by causing operation of the image sensor, and generates and stores image data based on image signals output by the image sensor (refer to FIG. 4, FIG. 6, and FIG. 8). Also, the body CPU 50 functions as a controller for focus control that causes operation of the image sensor between one rapid shooting exposure and the next and carries out first focus detection based on focus detection signals generated by phase difference detection pixels (refer to ranging A in FIG. 6, and to S29 and S33 in FIG. 9), carries out second focus detection based on focus detection signals generated by the phase difference detection pixels as a result of rapid shooting (refer to ranging B in FIG. 6 and to S25 and S27 and in FIG. 9), and carries out a focus adjustment operation based on results of the first focus detection and results of the second focus detection.

Also, the body side CPU 50 functions as a controller for focus control that corrects signal level of at least one of focus detection signals that have been taken under different exposure conditions (the pair of focus detections signals of the second focus detection). The body side CPU 50 also functions as a controller for focus control that corrects signal level of at least one of a focus detection signal used in the first focus detection and a focus detection signal used in the second focus detection (refer, for example, to FIG. 7A and FIG. 7B and to the ranging B at time t13-t21 in FIG. 6). The body side CPU 50 also functions as a controller for focus control that corrects a focus detection signal used in the second focus detection based on a difference between an exposure amount at the time of rapid shooting of still pictures, and an exposure amount at the time of acquiring focus detection signals from one rapid shooting frame to the next.

The body side CPU 50 also functions as a controller for focusing control that corrects a result of second focus detection in accordance with aperture opening at the time of rapid shooting (with result of first focus detection in accordance with subject brightness value as a reference) (refer to FIG. 7A and FIG. 7B, for example). The body side CPU 50 also functions as a controller for focus control that estimates position of the focus lens that will be in focus at the time of the next rapid shooting, using result of first focus detection (one or a plurality) and result of second focus detection (refer, for example, to S21 in FIG. 9).

Figure 10:
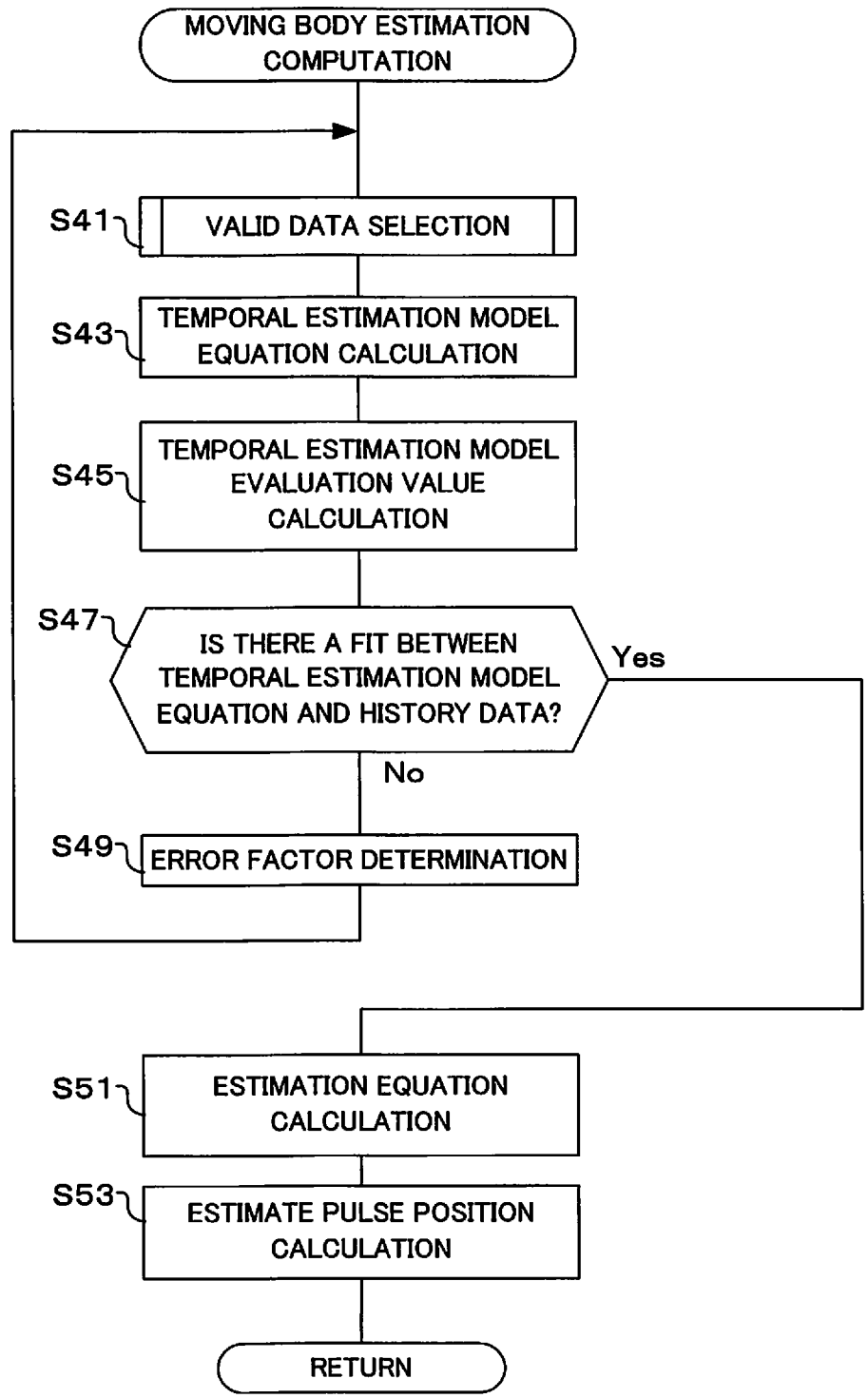
FIG. 10 is a flowchart showing moving body estimation computation operation of the camera of one embodiment of the present invention.

The body side CPU 50 also functions as a controller for focusing control that switches a modeling equation for predicting focus lens position that will be in focus based on dispersion in a plurality of first focus detection results and second focus detection results that have been acquired at different times (refer, for example, to S43-S49 in FIG. 10). The body side CPU 50 also functions as a controller for focusing control that determines dispersion by evaluating degree of fit between a modeling equation and first focus detection results and second focus detection results (refer, for example, to S47 and S49 in FIG. 10).

Next, pixel arrangement of the image sensor 33 will be described using FIG. 2. The image sensor 33 has photographing pixels in a Bayer array for R, Gr, Gb and B arranged at positions of R, Gr, Gb and B where hatching has not been applied. Also, phase difference detection pixels are arranged at positions of some Gr pixels where hatching has been applied. Among these pixels, phase difference detection pixel that are shown hatched upwardly to the right (in the drawings, (x4, y6), (x8, y5), (x12, y5), (x16, y5), (x20, y5)) are right opening phase difference detection pixels, while phase difference detection pixels that are shown hatched downwardly to the right (in the drawings, (x4, y9), (x8, y9), (x12, y9), (x16, y9), (x20, y9)) are left opening phase difference detection pixel.

Figure 2:
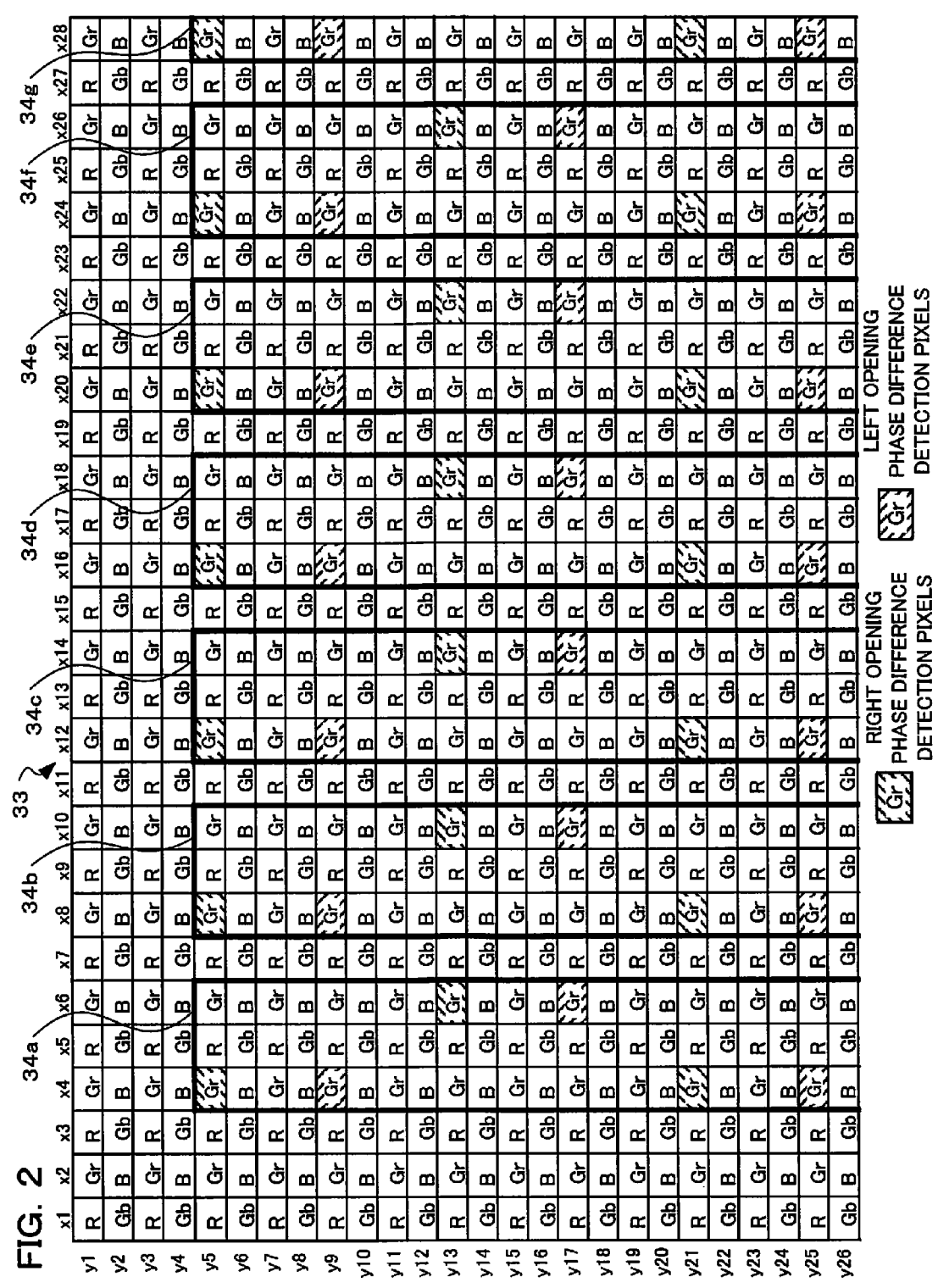

Also, right opening phase difference detection pixel and left opening phase difference detection pixel are made into pairs for each thick line frame 34a, 34b, 34c . . . shown within the image sensor 33 of FIG. 2, and respectively added in the vertical direction to give an AF area signal. Specifically, within the thick line frame 34a, right opening phase difference detection pixel output is an added value of outputs of pixels (x4, y5), (x6, y13), (x4, y21), . . . , and left opening phase difference detection pixel output is an added value of outputs of pixels (x4, y9), (x6, y17), (x4, y25), . . . . Similarly phase difference detection pixel output values for right openings and left openings are added for each of the thick line frames 34b, 34c, 34d, . . . . It should be noted that although not shown in the drawings, by arranging phase difference detection pixel for upper openings and lower openings it may be made possible to detect edges in a vertical direction using pairs of right openings and left openings, and to detect edges in a horizontal direction using pairs of upper openings and lower openings.

There are shooting pixels that are used as pixels for shooting, and phase difference detection pixel that are used for AF, in each AF area of the image sensor 33, as shown in FIG. 2, and at the time of actual exposure, among all pixel values that have been read out from the image sensor 33, only phase difference detection pixels that are arranged at predetermined positions are selectively used in AF calculation. At the time of ranging, pixel values of phase difference detection pixels may be selectively read out from the image sensor 33 and used. Also, at the time of ranging, after reading out pixel values of all pixels and storing in the memory 45, only pixel values of phase difference detection pixel may be read out from the memory 45 and used in AF calculation.

Figure 3:
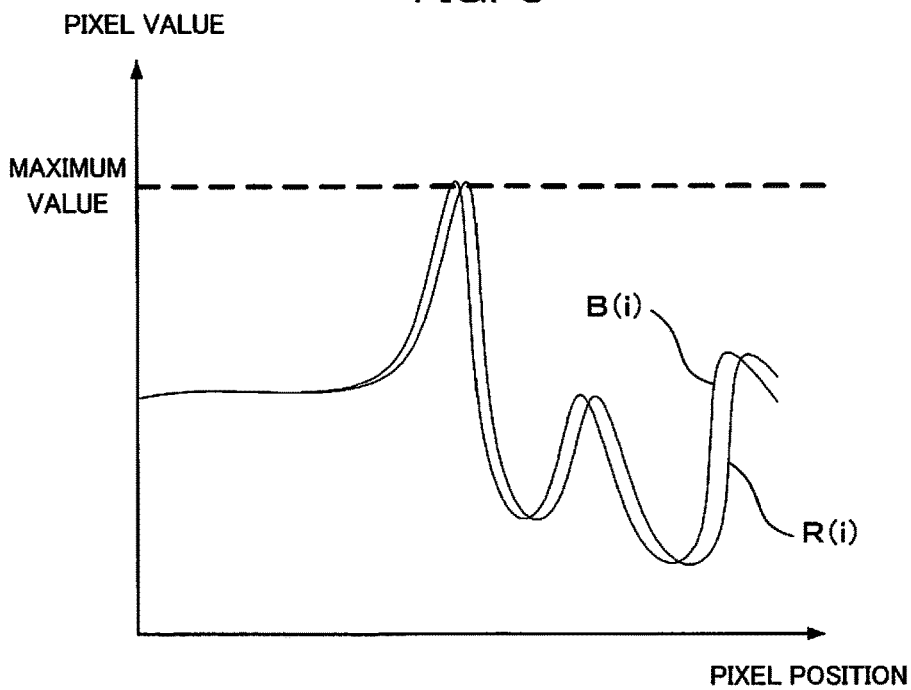
FIG. 3 is a graph showing phase difference detection signals based on image data from phase difference detection pixels of the camera of one embodiment of the present invention.

FIG. 3 shows a graph of values resulting from adding pixel values in a vertical direction for within every thick line frame shown in FIG. 2, for phase difference detection pixels within a single AF area. Phase signal B(i) at the left side of FIG. 3 is a value resulting from adding pixel outputs for right opening detection within the phase difference detection pixels, while phase signal R(i) on the right of FIG. 3 is a value resulting from adding pixel outputs for left opening detection. By detecting a phase difference between these two signals it is possible to calculate defocus amount of the focus lens.

FIG. 4 is a state transition diagram showing states of the camera, with there being three states (sequences) of a subject detection sequence #1, a 1R being maintained sequence #3 and a 2R sequence #5, and a completion state #7. If a half press operation of the release button is performed (1R on) the subject detection sequence #1 is executed. This subject detection sequence #1 detects a subject and carries out focus lens drive until in focus is approached.

If focus detection (AF) becomes possible as a result of the subject detection sequence #1, there is a transition to the 1R being maintained state #3 and ranging computation is repeatedly carried out. In a case where, during execution of the 1R being maintained state #3, ranging fails a given number of times to cause continuous AF errors, there is a transition to the subject detection sequence #1 and detection of a subject is carried out so that AF again becomes possible. Detailed operation of this 1R being maintained state #3 will be described later using FIG. 5.

On the other hand, if, during execution of the 1R being maintained state #3, a full press operation of the release button (2R on) is performed, there is a transition to the 2R sequence #5, and a subject shooting operation is carried out. In the event that 2R has been pressed the 2R sequence #5 is repeatedly executed and shooting is carried out. Detailed operation of this 2R sequence #5 will be described later using FIG. 9.

If, during execution of the 2R sequence #5, the full pressing is released (2R off) and 1R is maintained (half press (1R on)), then the 1R being maintained state #3 is executed, while on the other hand, if the full press and a half press are released to give 2R off, the completion state #7 is entered. Also, if the half press is released during execution of the 1R being maintained state #3 resulting in 1R off, the completion state #7 is entered.

Figure 5:
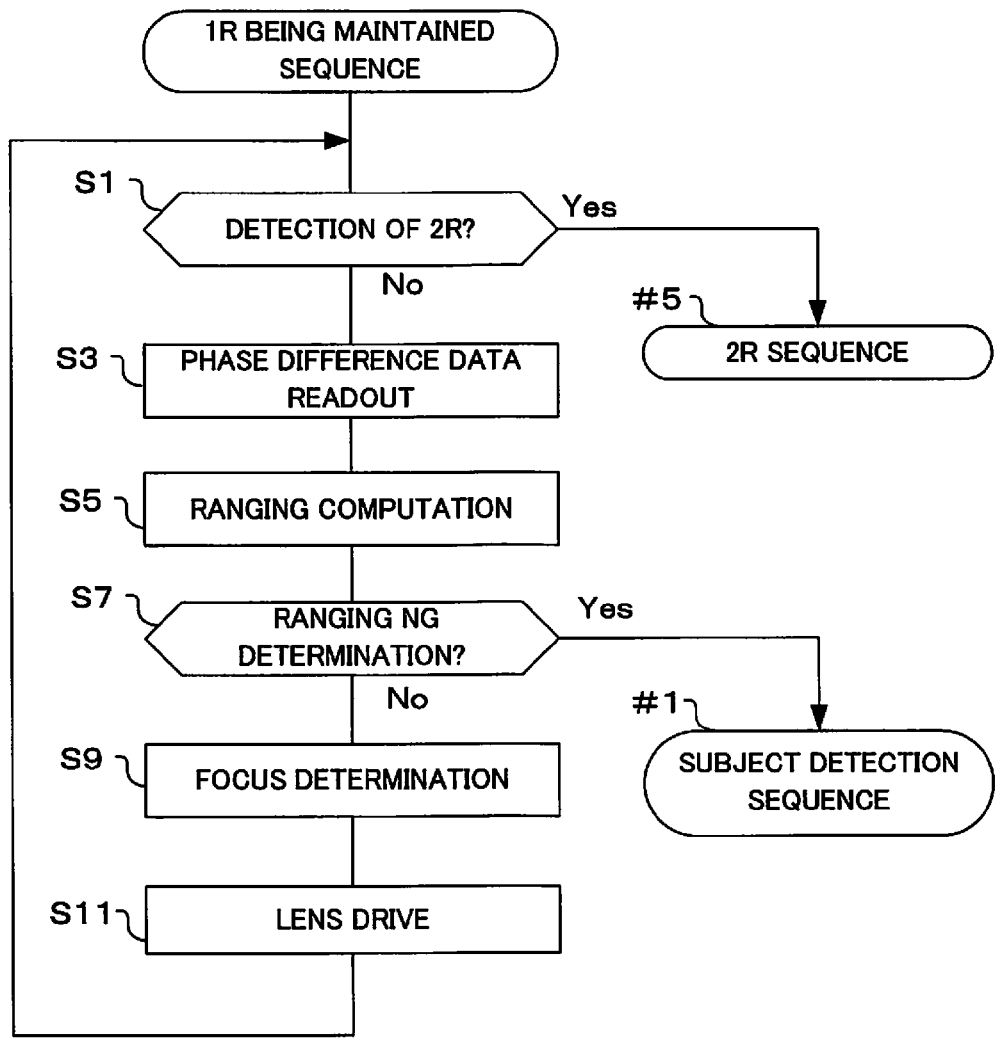
FIG. 5 is a flowchart showing 1R being maintained operation of the camera of one embodiment of the present invention.

Next, detailed operation of the 1R being maintained state #3 will be described using the flowchart shown in FIG. 5. This flowchart is executed by the body side CPU 50 controlling each section within the camera in accordance with programs that have been stored in the memory 45 (the same also applies to the flowcharts shown in FIG. 9 and FIG. 10 which will be described later).

If the 1R being maintained sequence is started, first 2R detection is carried out (S1). Here, it is detected whether or not the release button has been pressed down fully based on detection result of operating state of the release button within the UI control section 53. If the result of this determination is 2R on, namely that the release button has been pressed down fully and the 2R switch is on, there is a transition to the 2R sequence #5. The 2R sequence will be described later using FIG. 9.

On the other hand if the result of determination in step S1 is 2R off, namely that the release button is not pressed down fully but that the release button is pressed down half way (1R maintained), then read out of phase difference data is carried out (S3). Here, the image sensor drive section 43 reads out image data from phase difference detection pixels within the image sensor 33, namely, phase difference data (phase difference pixel data).

Once read out of phase difference data (phase difference pixel data) has been carried out, next ranging computation is carried out (S5). As ranging computation, luminance correction processing, correlation operations and reliability determination processing are carried out. The luminance correction processing is correction of pixel values of left openings and right openings in order to equalize luminance distribution according to image height depending on a lens. Correlation operations involve calculation of pixel added values for every AF area from images of right openings (reference signal) and left openings (reference signal), and calculation of correlation values of the two. In order to cut down on computation amount, the correlation operation uses a method of scanning a reference signal with a reference signal, and computing a degree of similarity for each position on the reference signal, for example, detecting position where a correlation computational value becomes minimum and degree of similarity is maximum.

By making one reference signal B(i) and making the other reference signal R(i), degree of similarity S(i) can be calculated from equation (1) below. It can be considered that a position where degree of similarity S(i) becomes a minimum value is where correlation between one reference signal and the other reference signal will be highest.

$$S(i) = \sum_{i=0}^{N-1} |B(i) - R(i)| \quad (1)$$

With reliability determination processing within the ranging computation, pixel saturation determination, contrast insufficient determination, monotonicity determination, correlation computation result determination etc. are carried out, and reliability of ranging computation result is evaluated. It should be noted, regarding ranging computation, that correlation computation etc. and computation carried out uniformly using a large amount of image data are executed by the AF circuit within the AF processing section 49, and other determination processing etc. is executed by the body side CPU 50.

If ranging computation has been carried out, next ranging NG determination is carried out (S7). Here, determination is based on a result of reliability determination processing that was carried out in step S5. If the result of this determination is that ranging result is NG, namely that the reliability of the range of results is low, there is a transition to the subject detection sequence #1. If the ranging result is NG, it is a case where the subject has been lost due to, for example, the photographer changing the direction in which the camera is pointing etc.

If the result of determination in step S7 is that ranging result is not NG, namely that reliability of the ranging result is high, focused determination is carried out (S9). Here, determination is based on, for example, whether or not a phase difference (or defocus amount) that has been calculated by the ranging computation of step S5 is less than or equal to a given value.

Once the focus determination has been carried out, lens drive is next performed (S11). Here, if the result of focus determination is non-focus, defocus amount is calculated from the ranging computation of step S5, and the focus lens is moved to an in focus position from this defocus amount.

If lens drive has been carried out, processing returns to step S1. By repeatedly executing this 1R maintained sequence, ranging is repeatedly carried out while maintaining 1R, and lens drive is carried out so as to keep the focus lens at an in focus position.

In this way, in the 1R being maintained sequence, while the release button is being pressed down half way phase difference data is read out at given time intervals (refer to S3), ranging computation is carried out using this phase difference data (S5), and lens drive is carried out based on a defocus amount that has been calculated (S11). It should be noted that although not described in the flowchart of FIG. 5, image data for live view is read out from the image sensor 33 at given time intervals, and live view display (refer to FIG. 6) and display of a focus mark at the time of focusing is carried out on the LCD 57 and the EVF 59.

Next, an operating sequence during continuous AF shown in FIG. 6 will be described. The horizontal axis shows the flow of time, while "exposure" on the vertical axis shows exposure operation of the image sensor 33, "AF" means exposure for ranging, and "LV" means exposure for live view. Exposure time at this time is controlled by an electronic shutter. Also, "actual exposure" is exposure in order to carry out shooting of still pictures for storage in the storage medium 67, and exposure time at this time is controlled by a mechanical shutter 31 is can.

"read out" on the vertical axis represents a readout operation of pixel data from the image sensor 33 by the image sensor drive section 43. "AF readout" means readout of pixel data from phase difference detection pixels for ranging, while "LV readout" means readouts of pixel data from imaging pixels for live view.

"Shutter" on the vertical axis represents a shift in operation of the mechanical shutter 31. "Computation" on the vertical axis represents ranging computation". Ranging A means ranging computation based on pixel data from phase detection pixels that has been acquired by means of AF exposure and AF readout. Ranging B means ranging computation based on pixel data from phase difference detection pixels that has been acquired by means of actual exposure and actual exposure readout. Also, estimation means moving body estimation computation for subject position (focus lens position) at the time of actual exposure, using history of ranging results using ranging A (and ranging B).

"lens" on the vertical axis means drive of the focus lens 11 ("lens drive" is drive of the focus lens 11). "aperture" on the vertical axis means drive of the aperture 15.

In FIG. 6, in the period from time t3 to t4, 2R, namely full press of the release button, is carried out. Until this full press is carried out (t1 to t3), 1R is being held, and at this time AF exposure and exposure for live view display (LV exposure) are repeatedly carried out. For example, from time t1 to t2, exposure for AF is carried out, pixel data at the time of AF exposure is read out from time t2 to t3, ranging A using readout pixel data is carried out from time t3 to t4, and from time t4 to t5 if defocus amount, which is a ranging result, represents defocus amount of a given amount or more, focus lens drive is carried out. Also, exposure for LV is carried out from time t2 to t3, pixel data at the time of LV exposure is read out from time t3 to t4, and LV display is carried out from time t4 to t5.

Exposure control with 1R being maintained is controlling the image sensor 33 by setting aperture to a wide open aperture value, and determining shutter speed (electronic shutter) and ISO sensitivity in accordance with subject brightness. With ranging A (t3 to t4) carried out while maintaining 1R, phase difference detection pixels are extracted from pixel data for at the time of AF exposure (time t1 to t2), and a phase difference detection signal such as shown in FIG. 3 is generated. Phase difference is then detected based on this phase difference detection signal that has been generated, and defocus amount is calculated from this phase detection signal and the focus lens is driven to an in focus position. While 1R is being maintained also, moving body estimation may be carried out using a ranging history for a number of occurrences of ranging A, and the focus lens driven.

If 2R is pressed (that is if the release button has been pressed down fully), a subject position at the time of actual exposure is estimated using history data (measurement results using ranging A) that was ranged while 1R was being maintained (that is, while the release button was pressed down half way). With the example shown in FIG. 6, estimation computation is carried out (t6 to t7) based on ranging results for ranging A (time t3 to t4, t5 to t6 and including history data that has further elapsed that is not shown in the drawing), and the focus lens is driven based on the estimate result.

If the focus lens has been moved based on the estimate result, actual exposure of a first frame of rapid shooting is commenced (time t11). Exposure time for actual exposure is controlled using the mechanical shutter 31 (t11 to t12). Also, aperture value of the aperture 15 is controlled to optimum exposure or to an aperture value that has been set by the user. Once actual exposure has been completed, all pixel data is read out from the image sensor 33, pixel data of phase detection pixels is extracted from among all of this pixel data, and ranging B is carried out using this pixel data. Focus lens drive is carried out using ranging results of ranging B in a case where movement speed of the subject is particularly fast. Lens drive need not be carried out if the subject is stationary or movement speed is slow.

If actual exposure for the first frame of rapid shooting and subsequent processing has been completed, then AF exposure (time t21 to t22, t23 to t24) and LV exposure (time t22 to t23, t24 to t25) are alternatively carried out until exposure for the following second frame of rapid shooting is commenced. If AF exposure has been carried out, and if AF readout and ranging A have been sequentially performed and LV exposure carried out, the LV readout and LV display are sequentially carried out. If exposure for the second frame of the next rapid shooting approaches, moving body estimation is carried out using history data that has been acquired using ranging A and ranging B up to that point (time t26 to t27). In this way, during rapid shooting, ranging is carried out using an image of an actual exposure in addition to ranging data of AF exposures between one actual exposure and the next actual exposure. In this way, since it becomes possible to shorten ranging interval during rapid shooting, trackability with respect to a moving body is improved.

FIG. 7A and FIG. 7B show phase difference detection signals at the time of AF exposure (refer to FIG. 7A) and phase difference detection signals at the time of actual exposure (refer to FIG. 7B), when the same subject has been photographed. Phase difference detection signals at the time of actual exposure have low signal level compared to phase difference detection signals that have been acquired at the time of AF exposure, despite having been taken under optimum exposure conditions at the time of shooting. This is because with imaging surface phase difference, light amount that is incident on the phase difference detection pixels of the image sensor 33 is restricted. If phase difference detection is carried out using the phase difference detection pixels at the time of actual exposure having low signal level and phase difference detection pixels at the time of AF exposure having high signal level, if reliability determination is carried out it will result in an error and it is not possible to carry out the phase difference detection. With this embodiment, therefore, with ranging computation (ranging B) where phase difference detection for actual exposure is carried out, phase difference detection computation is carried out after carrying out correction such that signal levels become substantially the same as those for AF exposure phase difference detection signals.

As shown in FIG. 6, with the 2R sequence ranging A and ranging B are mixed. Compared to ranging A where ranging computation is carried out using signals that have been acquired by means of AF exposure for ranging, ranging B carries out ranging computation by extracting signals of phase difference detection pixels from images for actual exposure.

Exposure correction is carried out such that signal levels of phase difference detection pixels that are shielded at the time of AF exposure become appropriate. On the other hand, at the time of actual exposure, since exposure control is performed such that imaging pixels become an appropriate level, phase difference detection pixels become a signal level that is about 1 step underexposed compared to AF exposure, even under conditions that have not been subjected to exposure correction. It should be noted that phase difference detection pixels are shielded such that open surface area is approximately half compared to photographing pixels.

Further, during 2R (when the release button is pressed down fully and shooting for storage is carried out), it is possible to set exposure correction using user settings, and signal level changes significantly as a result of this exposure correction condition. Correction is therefore carried out by superimposing a difference between AF exposure conditions and actual exposure conditions as a gain. This gain is computed using equation (2) to equation (4) below.

First, in the case of AF exposure, subject brightness value (BV value) is calculated using equation (2) below, from exposure setting for AF exposure.

$$bvaf = avaf + tvaf - svaf \quad (2)$$

Here, bvav is subject brightness value (Bv value) at the time of AF exposure, avaf is aperture value (Av value) at the time of AF exposure, tvaf is shutter speed value (Tv value) at the time of AF exposure, and svaf is ISO sensitivity (Sv value) at the time of AF exposure.

Subject brightness value (Bv value) at the time of actual exposure is calculated from an actual exposure indicated value using equation (3) below before commencement of actual exposure.

$$bvstill = avstill + tvstill - svstill \quad (3)$$

Here, bvstill is subject brightness value (Bv value) at the time of actual exposure, avstill is aperture value (Av value) at the time of actual exposure, tvstill is shutter speed value (Tv value) at the time of actual exposure, and svstill is ISO sensitivity (Sv value) at the time of actual exposure.

A differences between AF exposure BV, bvaf, and actual exposure Bv, bvstill is calculated, and an exposure offset amount cvaf is obtained from equation (4) below.

$$cvaf = bvaf - bvstill \quad (4)$$

If exposure offset amount cvaf has been calculated, then as shown, for example, in FIG. 8, a correction magnification for exposure offset amount is obtained, and based on this correction magnification the pixel data of phase difference detection pixels at the time of actual exposure are multiplied by a gain. In this way it is possible to make signal level differences of phase difference detection pixels, such as was shown in FIG. 7A and FIG. 7B, the same level.

Next, detailed operation of the 2R sequence #5 (refer to FIG. 4 to and FIG. 5) will be described using the flowchart shown in FIG. 9. This flowchart shown in FIG. 9 shows a rapid shooting sequence for still picture shooting.

If the 2R sequence is started, first, moving body estimation computation is carried out (S21). Moving body estimation computation corresponds to "estimation" of time t6 to t7 and t26 to t27 in FIG. 6. In this step, an estimation model is constructed using previous ranging data, and dispersion condition for ranging results is evaluated using this estimation model that has been constructed. Also, moving body estimation computation carries out computation to estimate subject position at the time of actual exposure, and focus lens drive amount is calculated based on the estimation result. In a case where the focus lens drive section 17 has a stepping motor, this drive amount is calculation of an estimated pulse position that represents a focus lens position (subject estimated position) corresponding to a number of steps of the stepping motor. Detailed operation of this moving body estimation computation will be described later using FIG. 10.

If moving body estimation computation has been carried out, next lens drive for actual exposure is carried out (S23). Lens drive for actual exposure corresponds to "lens drive" of time t7 to t11 in FIG. 6. In this step, the focus lens 11 is driven to an estimated pulse position based on the result of estimation computation that was computed in step S21. Also, in parallel, aperture drive is also carried out such that the aperture 15 gives an appropriate exposure. By carrying out lens drive for actual exposure, it is possible to achieve focus on the subject at the time of actual exposure shooting, even if the subject is moving.

If lens drive for actual exposure has been carried out, next actual exposure is carried out (S25). Actual exposure corresponds to the "actual exposure" of time t11 to t12 in FIG. 6. In this step, exposure time is controlled by the mechanical shutter 31 so as to achieve appropriate exposure or an exposure condition set by the user, a subject image is formed on the image sensor 33, and photoelectric conversion is carried out. After the exposure time has elapsed, the image sensor drive section 43 reads out pixel data of all pixels of the image sensor 33 (imaging pixels and phase difference detection pixels).

If actual exposure has been completed, next lens drive for ranging is carried out in preparation for AF exposure (S27). Lens drive for ranging corresponds to "lens drive" of time t13 to t21 in FIG. 6. There may be situations where a subject is moving while exposure time for actual exposure is elapsing. In this step, therefore, movement from the subject position at the time of actual exposure of step S21 to the subject position at the time of AF exposure of step S29 is estimated, and the focus lens 11 is moved so as to achieve approximate focus at that position. This lens drive is carried out when movement speed of the subject is fast.

Also, "ranging B" is carried out in parallel with the lens drive for ranging of t13 to t21. This ranging B is carried out at time t13 to t15 in FIG. 6. Ranging B involves extracting pixel data of phase difference detection pixel from within all pixels that have been read out after completion of actual exposure (photographing pixels and phase difference detection pixels), and carrying out ranging computation using this pixel data. At the time of actual exposure, differing from the time of AF exposure, since exposure condition is not appropriate for phase difference detection pixels, signal level of phase difference detection pixel data is corrected so as to coincide at the time of actual exposure and at the time of AF exposure.

Also, regarding computation for ranging A, since, in a case where setting of a number of rapid shooting frames is large, interval between actual exposures of the rapid shooting becomes short, shooting timing is detected quickly and the number of times ranging is carried out is reduced. Also, since, in a case where setting of a number of frames for rapid shooting is low, interval between actual exposures of the rapid shooting becomes long, and so shooting timing is detected slowly and the number of times ranging is performed is increased. Ranging results that have been computed with ranging A and ranging results that have been computed with ranging B are used together as history data at the time of the next moving body estimation computation.

If lens drive for ranging has been carried out, next AF exposure is carried out (S29). AF exposure corresponds to the "AF" of time t21 to t22 and t23 to t24 in FIG. 6. Between one actual exposure and the next actual exposure at the time of rapid shooting, the image sensor 33 is exposed to light for the purpose of ranging, and imaging is carried out in order to acquire pixel data from phase difference detection pixels. At the time of this AF exposure, aperture drive is carried out until before AF exposure commencement so that the aperture becomes a wide-open aperture value. It should be noted that in FIG. 6 ranging A is carried out two times, but the number of times that ranging A is carried out varies in accordance with a number of frames set for rapid shooting and exposure time at the time of actual exposure etc.

Once AF exposure has been carried out, next phase difference data (phase difference pixel data) readout is carried out (S31). Phase difference data readout (phase difference pixel data read-out) corresponds to the "AF read" of time t22 to t23 and t24 to t25 in FIG. 6. In this step, the image sensor drive section 43 reads out pixel data from phase difference detection pixels from the image sensor 33.

If phase difference data has been read out, next ranging computation is carried out (S33). Ranging computation corresponds to "ranging A" of time t23 to t24 and t25 to t26 in FIG. 6. In this step, ranging computation is carried out based on phase difference data (phase difference pixel data) that was read out in step S31. The result of this computation is used as history data at the time of the next moving body estimation computation.

If ranging computation has been carried out, it is determined whether or not it is time to carry out shooting (S35). With rapid shooting mode, a number of rapid shooting frames is set, a shooting interval for actual shooting (actual exposure) is determined in accordance with this number of rapid shooting frames, and AF exposure is repeated during this shooting. For example, if setting of the number of rapid shooting frames is 5, an interval for commencement of actual exposure becomes 200 (ms). In this step it is determined whether the time of the next actual shooting (actual exposure) has been reached. If the result of this determination is that it is not the time of shooting (time of actual exposure) processing returns to step S29 and the next AF exposure is carried out.

On the other hand, if the result of determination in step S35 is that a shooting time has been detected, it is next determined whether or not 2R is off (S37). In the event that the photographer has completed rapid shooting, full pressing of the release button is released (2R off). In this step, therefore, determination is based on the operating state of the release button.

If the result of determination in step S37 is that it is not 2R off, namely that full pressing of the release button is being maintained, processing returns to step S21 and operations such as moving body estimation and actual exposure for the next rapid shooting frame are carried out. On the other hand, if the result of determination in step S37 is 2R off, rapid shooting is completed.

In this way, at the time of the 2R sequence of this embodiment, namely rapid shooting, actual shooting (actual exposure) (S25) is repeatedly carried out at a given shooting interval while the release button is being pressed down fully (S37 No), and ranging computation (S27) is carried out in parallel with lens drive for ranging, based on phase difference pixel data that has been acquired by the actual exposure. Also, AF exposure for ranging is carried out between one actual exposure and the next actual exposure (S29), and ranging computation is carried out (S33) based on phase difference pixel data that has been acquired by this AF exposure. Then, moving body estimation computation for the subject is carried out (S21) based on phase difference pixel data that has been acquired by the actual exposure and the AF exposure. Since ranging computation is carried out by acquiring phase difference pixel data using AF exposure in addition to actual exposure, information relating to subject position at the time of moving body estimation becomes dense, and it is possible to increase precision of movement estimation.

Next, details of the moving body estimation computation of step S21 will be described using the flowchart shown in FIG. 10.

If the flow for moving body estimation computation is entered, first, valid data is selected (S41). Here, selection of history data used in temporal prediction model equation calculation is carried out. The number of items of data selected is determined in accordance with parameters representing degree of following performance of camera settings (lock on mode), as well as image plane movement speed, in a case where image plane movement speed are calculated. In a case where image plane movement speed is fast and a case that is sensitive to lock on setting, the number of items of data extracted is reduced, while conversely in a case where image plane movement speed is slow and a case that is insensitive to lock on setting, the number of items of data extracted is increased.

If valid data has been selected, next a temporal predication model equation is calculated (S43). Here, a temporal estimation model equation is generated using the valid data that has been selected. A predetermined plurality of approximations are prepared, and these approximations are made temporal estimation model equations. For example, there is a method that formulates a first order equation and a second order equation by a least squares method using valid data.

If temporal prediction model equations have been calculated, next an evaluation value for a temporal prediction model equation is calculated (S45). Here, an evaluation value of a temporal estimation model equation, for evaluating degree of fit between the temporal prediction model equations and history data used in temporal prediction model equation calculation, is calculated. As an evaluation value there is an integrated value of differences of each ranging time point, using the valid data that was selected in S41 and temporal estimation model equations that were selected in step S43.

Figure 11A:
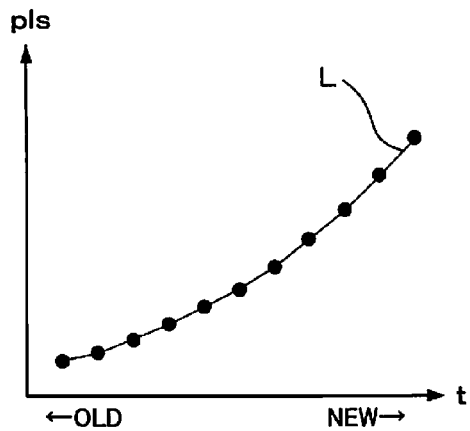
FIG. 11A and FIG. 11B are graphs showing prediction models, in the camera of one embodiment of the present invention.
Figure 11B:
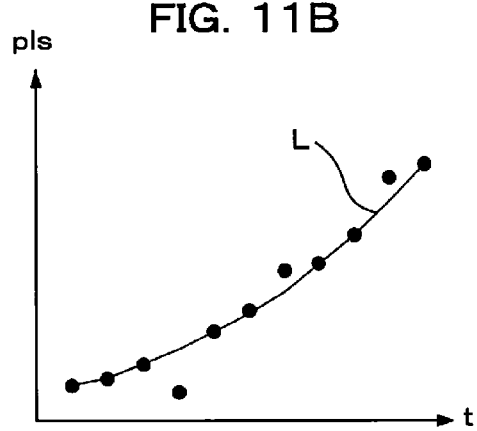
Figure 12A:
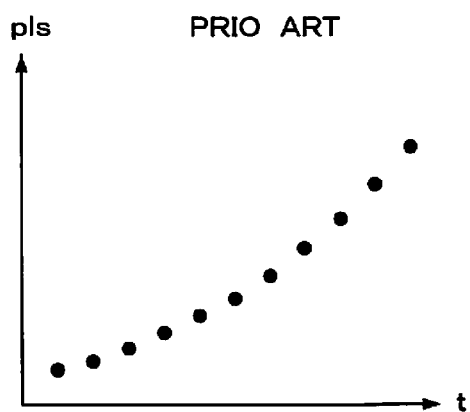
FIG. 12A and FIG. 12B are drawings for describing ranging dispersion at the time of ranging of a subject using continuous AF.
Figure 12B:
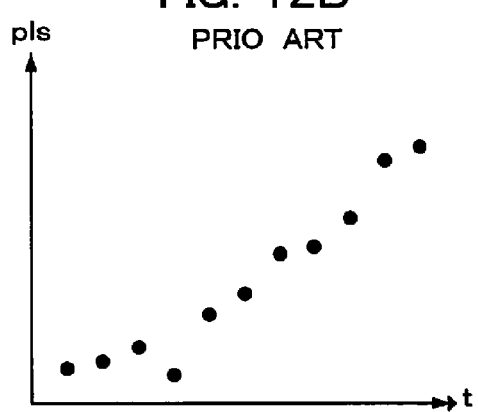

Next it is determined whether or not a temporal estimation model equation and history data fit (S47). Here it is determined whether or not there is a fit between temporal estimation model equation and history data (valid data of S41), based on the evaluation of step S45. Degree of fit between temporal estimation model and history data is shown in FIG. 11A and FIG. 11B, with the vertical axis showing time and the horizontal axis showing subject position (represented by pulse number pls). Black circles in the graphs represent ranging results (represented by pulse number pls) for each ranging time point, which are history data, and the solid line L represents an estimation model equation. In FIG. 11A history data lie on the estimation model, and in this case it is determined that the fit to the estimation model is good. On the other hand, in FIG. 11B, history data is offset from the estimation model, and in this case it is determined that the fit to the estimation model is bad.

If the result of determination in step S47 is that it has been determined that there is not a fit to the temporal estimation model, error factor determination is carried out (S49). Here, error distribution is evaluated, and fed back when calculating the next temporal estimation model. Specifically, in a case where a difference between a temporal estimation model and each history data is larger than a given value, it is determined that dispersion in each history data is large, and the number of items for valid date selection is increased. Models are constructed such that temporal estimation model equation evaluation value becomes a given value or less. By changing temporal estimation model equation from a first-order function to a second-order function, for example, changing to a higher-order function etc. is carried out.

On the other hand, if the result of determination in step S47 is that it has been determined that there is a fit to the temporal estimation model, an estimation equation is calculated (S51). Here, a temporal estimation model equation that was selected in step S43 is adopted as an estimation model equation.

Next, an estimated pulse position is calculated (S53). Here, using history data for previous ranging results and an estimation equation that was calculated in S51, subject position after a given time has elapsed is estimated and estimated pulse position is calculated. If estimated pulse position has been calculated, the originating flow is returned to and driving of the focus lens is carried out (S23).

In this way, in the flow for moving body estimation computation, degree of fit between a temporal estimation model equation and history data (valid data) is calculated (S45 and S47), and if the degree of fit is within a given range moving body estimation is carried out using the temporal estimation model equation (S51 and S53). As a result it is possible to increase precision of moving body estimation. Also, if the degree of fit is not within a given range error factors are determined and fed back (S49), and a temporal estimation model equation is changed (S43). As a result it is possible to derive an optimum estimation model equation. Also, valid data is selected from within history data (S41). As a result it is possible to carry out moving body estimation using data that is suitable for continuous AF etc. that has been set by the photographer.

As has been described above, with the one embodiment of the present invention, in a case where an image plane phase difference method has been used as an autofocus method, even if a moving subject is photographed and ranging dispersion arises, it is determined whether or not there is dispersion in ranging results, also including ranging results that use an actual exposure taken image (S47 in FIG. 10) for moving body prediction, and a moving body prediction method is switched in accordance with dispersion conditions of the ranging results (S43, S47, S49 in FIG. 10). This means that it is possible to photograph with good precision with continuous AF, it is possible to prevent reduction in focusing precision of a taken image, and it is possible to make an image device small in size and light weight. Also, since it is possible to carry out stable control for ranging dispersion even with an image plane phase difference method, it is possible to photograph a subject that is moving with good precision using continuous AF.

Also, with the one embodiment of the present invention, during rapid shooting an image sensor is operated, first focus detection is carried out based on focus detection signals generated by phase difference detection pixels (refer to AF exposure and ranging A in FIG. 6, and to S29 and S33 in FIG. 9), second focus detection is carried out based on focus detection signals generated by the phase difference detection pixels as a result of rapid shooting (refer to actual exposure and ranging B in FIG. 6 and to S25 in FIG. 9), and a focus adjustment operation is carried out based on result of the first focus detection and result of the second focus detection (refer to S23 and S27 in FIG. 9). Since a focus adjustment operation is carried out using not only focus detection signals that have been acquired at the time of rapid shooting but also focus detection signals that have been acquired between one rapid shooting and the next rapid shooting, it is possible to carry out a focus detection operation and moving body estimation with high precision using a large number of ranging results.

Also, with the one embodiment of the present invention, signal level of at least one of the pair of focus detection signals in the second focus detection is corrected (second focus detection signal is corrected so as to become the same signal level as the first focus detection signal that constitutes a reference) (refer, for example, to FIG. 7A and FIG. 7B). This means that even if levels of focus detection signals that have been acquired under different exposure conditions are different, they can be used without the addition of complicated processing such as switching computation circuits at later stages.

Also, with the one embodiment of the present invention, there is the aperture 15 that adjusts light flux passing through a shooting optical system that will be received by the image sensor 33, and a controller for focusing control corrects results of the second focus detection in accordance with aperture opening at the time of rapid shooting (refer, for example, to FIG. 7A, FIG. 7B, and S33 in FIG. 9). It should be noted that the results of the first focus detection may be corrected instead of correcting results of the second focus detection.

Also, with the one embodiment of the present invention, position of the focus lens where focus will be achieved at the time of the next rapid shooting is estimated using results of first focus detection and results of second focus detection (for example, S21 in FIG. 9). Since the number of ranging results used when carrying out moving body estimation is increased, it is possible to carry out high precision moving body estimation.

Also, with the one embodiment of the present invention a model for predicting focus lens position that will be in focus is switched based on dispersion in a plurality of first focus detection results and second focus detection that have been acquired at different times (for example, S43-S49 in FIG. 10). This means that it is possible to set an optimal model, and it is possible to carry out high precision estimation.

Also, with one embodiment of the present invention, still picture rapid shooting is carried out by causing operation of the image sensor, image data is generated based on image signals output from the image sensor (for example, t11 to t12 in FIG. 6 and S23 in FIG. 9), between rapid shooting exposures the image sensor is operated and first focus detection is carried out based on focus detection signals that have been generated using phase difference detection pixels (for example, ranging A of t21 to t22 and t23 to t24 in FIG. 6 and S29 and S33 in FIG. 9), second focus detection is carried out based on focus detection signals generated by phase difference detection pixels as a result of rapid shooting (for example, ranging B of t11 to t12 and t13 to t15 in FIG. 6 and S27 in FIG. 9), and a focus adjustment operation is carried out based on results of the first focus detection and results of the second focus detection. As a result it is possible to carry out focusing with good precision even when rapid shooting is carried out.

It should be noted that with the one embodiment of the present invention, in a case where continuous AF mode has been set focus detection is carried out using moving body estimation, but in a case where moving body estimation cannot be carried out, focus adjustment may be carried out in accordance with focus detection results simply using a phase difference method.

Also, with one embodiment of the present invention, phase difference detection pixels are arranged on an imaging surface of the image sensor. However, this is not limiting, and in a single lens reflex camera or the like sensors that are specifically dedicated to phase difference detection may be provided separately to an image sensor for still picture acquisition.

Also, with the one embodiment of the present invention, ranging A is carried out two times between rapid shooting exposures (refer to FIG. 6), but the number of times that ranging A is carried out may be one time, or three or more times, provided it is appropriately determined in accordance with time between rapid shooting exposures and time required for AF exposure etc.

Also, with the one embodiment of the present invention, regarding the AE processing section 47, AF processing section 49, lens control section 51, UI control section 53, display control section 55, image processing section 61, compression and expansion section 63, storage medium control section 65 etc., some or all of the functions of each section may be implemented using a CPU (Central Processing Unit), peripheral circuits of the CPU and program code, and may be implemented by circuits that are executed by program code such as a DSP (Digital Signal Processor), may use a hardware structure such as gate circuits that are generated based on a programming language described using Verilog, or may be executed using hardware circuits.

Also, with the one embodiment of the present invention, an instrument for taking pictures has been described using a digital camera, but as a camera it is also possible to use a digital single lens reflex camera or a compact digital camera, or a camera for movie use such as a video camera, and further to have a camera that is incorporated into a mobile phone, a smartphone, a mobile information terminal, personal computer (PC), tablet type computer, game console etc., or a camera for a scientific instrument such as a microscope, a camera for mounting on a vehicle, a surveillance camera etc. In any event, it is possible to adopt the present invention as long as a device has a rapid shooting function.

Also, among the technology that has been described in this specification, with respect to control that has been described mainly using flowcharts, there are many instances where setting is possible using programs, and such programs may be held in a storage medium or storage section. The manner of storing the programs in the storage medium or storage section may be to store at the time of manufacture, or by using a distributed storage medium, or they be downloaded via the Internet.

Also, regarding the operation flow in the patent claims, the specification and the drawings, for the sake of convenience description has been given using words representing sequence, such as "first" and "next", but at places where it is not particularly described, this does not mean that implementation must be in this order.

As understood by those having ordinary skill in the art, as used in this application, 'section,' 'unit,' 'component,' 'element,' 'module,' 'device,' 'member,' 'mechanism,' 'apparatus,' 'machine,' or 'system' may be implemented as circuitry, such as integrated circuits, application specific circuits ("ASICs"), field programmable logic arrays ("FPLAs"), etc., and/or software implemented on a processor, such as a microprocessor.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. An imaging device, that has an image sensor formed with phase difference detection pixels that generate pairs of focus detection signals by subjecting light flux that has passed through an optical system, including a focus lens, to pupil division, receiving light and carrying out photoelectric conversion, and that carries out focus adjustment based on focus detection signals output by the image sensor, the imaging device comprising:

a processing circuit that carries out rapid shooting of still picture by causing operation of the image sensor, and generates and stores image data based on image signals output by the image sensor; and a controller for focusing control, that causes operation of the image sensor between rapid shooting exposures to carry out first focus detection based on focus detection signals generated by the phase difference detection pixels, carries out second focus detection based on focus detection signals generated by the phase difference detection pixels as a result of the rapid shooting, and carries out focus adjustment based on results of the first focus detection and results of the second focus detection, wherein the controller for focusing control focus lens estimates position of the focusing lens that will be in focus at the time of the next rapid shooting, using results of the first focus detection and results of the second focus detection.

2. The imaging device of claim 1, wherein:
the controller for focusing control corrects signal level of at least one of focus detection signals used in the first focus detection and focus detection signals used in the second focus detection.

3. The imaging device of claim 1, further comprising:
an exposure control circuit that controls exposure operation by calculating exposure control values in order to control exposure amount of the image sensor at the time of rapid shooting of still pictures or at the time of acquiring focus detection signals between one rapid shooting exposure and the next rapid shooting exposure, wherein the controller for focusing control corrects a focus detection signal used in the second focus detection based on a difference between an exposure amount at the time of rapid shooting of still pictures, and an exposure amount at the time of acquiring focus detection signals between one rapid shooting exposure and the next rapid shooting exposure.

4. The imaging device of claim 3, wherein:
the exposure control circuit has an aperture that adjusts light flux passing through the photographing optical system that will be received by the image sensor, and
the controller for focusing control corrects focus detection signals used in the second focus detection in accordance with opening of the aperture at the time of the rapid shooting.

5. The imaging device of claim 1, wherein:
the controller for focusing control switches a modeling equation for estimating focus lens position that will be in focus based on dispersion of a plurality of results of the first focus detection and results of the second focus detection that have been acquired at different times.

6. The imaging device of claim 1, wherein:
the controller for focusing control determines the dispersion by evaluating degree of fit of the model equation to results of the first focus detection and results of the second focus detection.

7. A focus adjustment method, for an imaging device that has an image sensor formed with phase difference detection pixels that generate pairs of focus detection signals by subjecting light flux that has passed through an optical system, including a focus lens, to pupil division, receiving light and carrying out photoelectric conversion, and that carries out focus adjustment based on focus detection signals output by the image sensor, comprising:
carrying out rapid shooting of still pictures by causing operation of the image sensor, and generating and storing image data based on image signals output by the image sensor;
causing operation of the image sensor between one exposure and the next exposure of the rapid shooting, and carrying out first focus detection based on focus detection signals generated by the phase difference detection pixels;
carrying out second focus detection based on focus detection signals generated by the phase difference detection pixels as a result of the rapid shooting;
carrying out a focus adjustment operation based on results of the first focus detection and results of the second focus detection; and
estimating position of the focus lens that will be in focus at the time of the next rapid shooting, using results of the first focus detection and results of the second focus detection.

8. The focus adjustment method of claim 7, further comprising:
correcting signal level of at least one of focus detection signals used in the first focus detection and focus detection signals used in the second focus detection.

9. The focus adjustment method of claim 7, further comprising:
controlling exposure operation by calculating exposure control values in order to control exposure amount of the image sensor at the time of the rapid shooting of still pictures or at the time of acquiring focus detection signals between one rapid shooting exposure and the next rapid shooting exposure; and
correcting a focus detection signal used in the second focus detection based on a difference between an exposure amount at the time of the rapid shooting of still pictures, and an exposure amount at the time of acquiring focus detection signals between one rapid shooting exposure and the next rapid shooting exposure.

10. The focus adjustment method of claim 9, wherein:
the imaging device has an aperture that adjusts light flux passing through the photographing optical system that will be received by the image sensor, and further comprising
correcting focus detection signals used in the second focus detection in accordance with opening of the aperture at the time of the rapid shooting.

11. The focus adjustment method of claim 7, further comprising:
determining the dispersion by evaluating degree of fit between the model equation and results of the first focus detection and results of the second focus detection.

12. A non-transitory computer-readable medium storing a processor executable code, which, when executed by at least one processor, performs a focus adjustment method, for an imaging device that has an image sensor formed with phase difference detection pixels that generate pairs of focus detection signals by subjecting light flux that has passed through an optical system, including a focus lens, to pupil division, receiving light and carrying out photoelectric conversion, and that carries out focus adjustment based on focus detection signals output by the image sensor, the focus adjustment method comprising:
carrying out rapid shooting of still pictures by causing operation of the image sensor, and generating and storing image data based on image signals output by the image sensor;
causing operation of the image sensor between one rapid shooting exposure and the next rapid shooting exposure and carrying out first focus detection based on focus detection signals generated by the phase difference detection pixels;
carrying out second focus detection based on focus detection signals generated by the phase difference detection pixels as a result of the rapid shooting;
carrying out a focus adjustment operation based on results of the first focus detection and results of the second focus detection; and
estimating position of the focus lens that will be in focus at the time of the next rapid shooting, using results of the first focus detection and results of the second focus detection.

* * * * *